United States Patent [19]

Cochavy

[11] Patent Number: 5,797,039
[45] Date of Patent: Aug. 18, 1998

[54] METHOD OF EFFICIENTLY SENDING PACKETS ONTO A NETWORK BY ELIMINATING AN INTERRUPT

[75] Inventor: Baruch Cochavy, Haifa, Israel

[73] Assignee: Intel Corporation, Santa Clara, Calif.

[21] Appl. No.: 578,197

[22] Filed: Dec. 29, 1995

[51] Int. Cl.[6] ................................................ G06F 13/14
[52] U.S. Cl. ..................... 395/872; 395/875; 395/200.8
[58] Field of Search ........................... 395/200.07, 200.2, 395/250, 843, 876, 872, 868, 875

[56] References Cited

U.S. PATENT DOCUMENTS

| | | | |
|---|---|---|---|
| 5,210,749 | 5/1993 | Firoozmand | 370/465 |
| 5,247,626 | 9/1993 | Firoozmand | 395/200.07 |
| 5,282,201 | 1/1994 | Frank et al. | 370/403 |
| 5,301,275 | 4/1994 | Vanbuskirk et al. | 395/250 |
| 5,363,484 | 11/1994 | Desnoyers et al. | 395/200.07 |
| 5,488,724 | 1/1996 | Firoozmand | 395/200.07 |
| 5,615,392 | 3/1997 | Harrison et al. | 395/876 |
| 5,617,537 | 4/1997 | Yamada et al. | 395/200.07 |

Primary Examiner—Eddie P. Chan
Assistant Examiner—Gary J. Portka
Attorney, Agent, or Firm—Blakely, Sokoloff, Taylor & Zafman

[57] ABSTRACT

Computer programs transmit information over computer networks through the use of a network driver programs. To efficiently transmit information across a network, an improved network driver program is introduced. The improved network driver program receives a pointer to a memory block containing information to be sent. The network driver program then modifies the write protection of the memory page containing the received memory block such that the memory block is write-protected. The network driver program then starts a direct memory access (DMA) operation and returns control to the original program. The DMA operation will continue while the original program continues execution. When the DMA operation is complete, the page characteristics of the received memory block will be changed back to read/write so that the memory block may be used again.

8 Claims, 6 Drawing Sheets

METHOD OF EFFICIENTLY SENDING PACKETS ONTO A NETWORK BY ELIMINATING AN INTERRUPT

FIELD OF THE INVENTION

The present invention pertains to the field of computer network communication. More particularly, the present invention discloses a method for efficiently sending packets from a computer program to a network communication driver.

BACKGROUND OF THE INVENTION

To increase efficiency, most computers used within an office environment are connected together into a computer network. The computer network allows the users to share information and to share computer resources coupled to the network such as printers, modems, and servers.

The speed at which computer network communications is taking place is increasing. It is therefore important to make the routines that send and receive network communication packets as efficient as possible such that information can be transmitted as fast as possible.

Associated with most computer communication systems are network communication subroutines and hardware generated events such as interrupts that indicate to the central processing unit (CPU) that a hardware device is in need of service. It is critical that network communication subroutines and interrupt handling routines be as efficient as possible such that the CPU can quickly handle network communication requests and return to the processing of normal computer programs.

Today's era of sophisticated computer processors maintain a significant amount of task dependent state information such as cache memory buffers, branch target buffers (for branch prediction), and return stack buffers. The stored state information is best utilized if the processor performs as few task switches or interrupts as possible.

SUMMARY AND OBJECTS OF THE INVENTION

It is therefore an object of the present invention to provide a very efficient send-packet subroutine to send network communications packets out onto the computer network such that the processor may return to the calling program for further processing.

It is a further objective of the present invention to eliminate any extra interrupt routines used for computer network communication. These and other objectives are achieved by the method for eliminating an interrupt during routine of the present invention.

In the present invention, when a program thread needs to send a network communication packet, the program calls the efficient send-packet routine of the present invention. The send-packet routine receives a buffer containing data to be sent out onto the network. The send-packet routine immediately marks the page or pages of memory containing the received buffer as read-only using memory protection features provided by the processor. The send-packet routine then immediately calls a send-complete callback routine to inform the calling program that the data packet has been sent out onto the network. The send-packet routine then immediately returns back to the calling program so that it may continue processing. When a network driver has a chance to send the data packet, then the network driver transmits the data packet and changes the read-only status of the memory pages containing the buffer back into a read/write status. If the program attempts to write to the memory pages marked as read-only, then the program will enter an interrupt routine that either copies the contents of the buffer to a safe region or waits until the network driver sends the packet. The interrupt routine then changes the memory pages back to read/write and the interrupt routine returns.

BRIEF DESCRIPTION OF THE DRAWINGS

The objects, features and advantages of the present invention will be apparent to one skilled in the art, in view of the following detailed description in which.

DETAILED DESCRIPTION

A method for implementing an efficient send-packet routine and eliminating an interrupt is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Novell Network Operating System Open Data-Link Interface (ODI). However, the same techniques can easily be applied to other Network Operating systems or any other network driver architecture.

A Computer System

Figure 1:
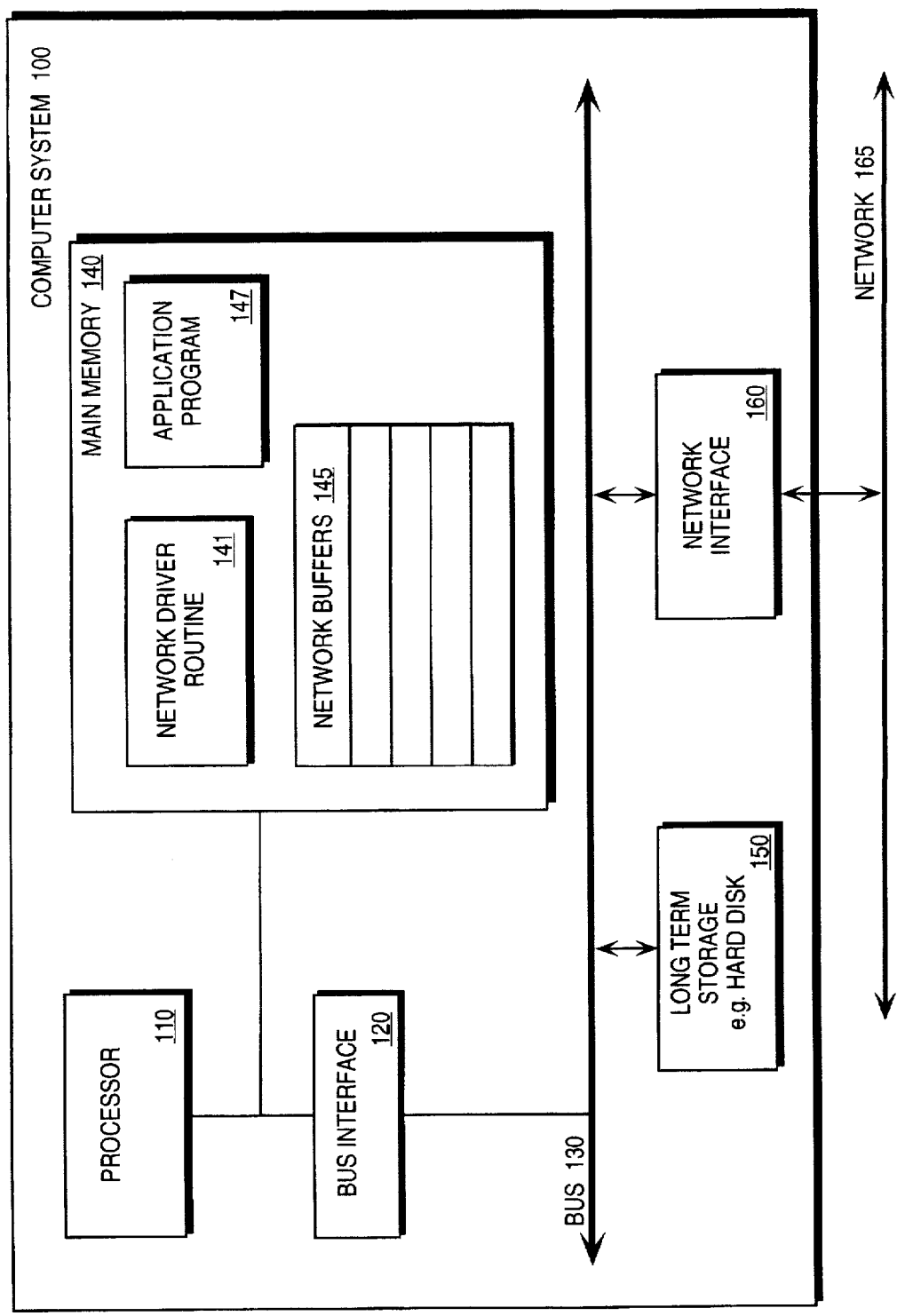
FIG. 1 illustrates a computer that may be used to implement the present invention.

FIG. 1 illustrates a typical computer system 100 that can be used to implement the teachings of the present invention. The computer system 100 comprises a processor 110 and a main memory 140 for processing computer instructions and data. The processor 110 is coupled to a computer bus 130 through a bus interface 120. The computer bus 130 couples the processor 110 and main memory 140 to server Input/Output units such as long term storage device 150 and network interface 160. The present invention teaches methods and an apparatus for transferring information from an application program 147 to a computer network 165 using network buffers 145.

An Early Send-Packet Routine

Figure 2A:
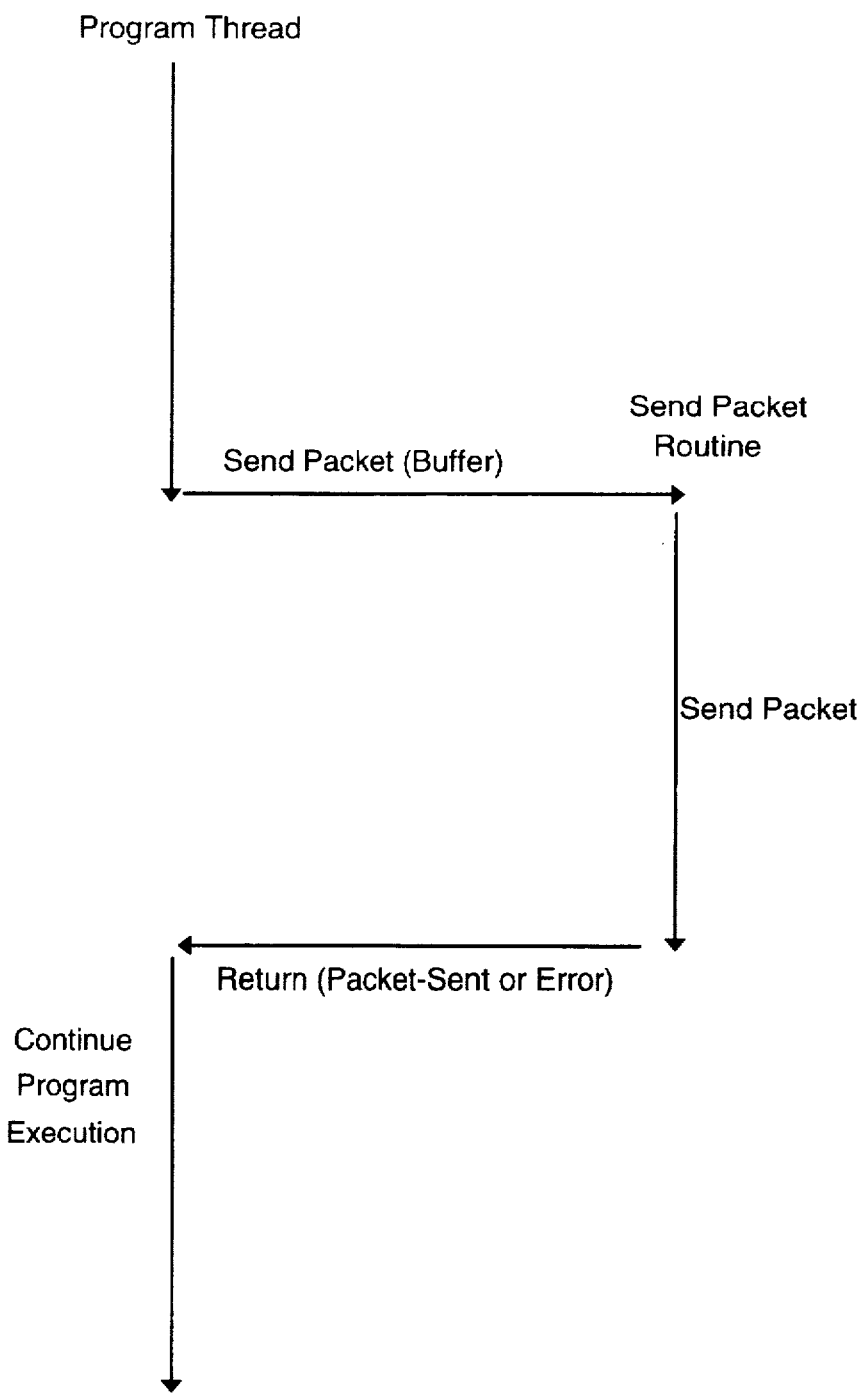
FIG. 2A illustrates the flow of a send-packet routine that completely performs the send-packet procedure and then returns back to the original program with a result code of packet-sent or error.

A simple method of implementing a send-packet routine is to write a subroutine that completely performs all the functions required to send a data packet out onto a computer network. FIG. 2A illustrates the program flow for such send-packet routine. As illustrated in FIG. 2A a normal program thread continues until a data packet needs to be sent. The program then calls the send-packet subroutine with a buffer that contains the data to be sent. The send-packet subroutine then executes while the main program thread remains suspended. The send-packet routine communicates directly with the network hardware and sends the information stored within the buffer. When the send-packet routine of FIG. 2A has completely completed its operation it then returns back to the original program thread with a return code that indicates if the packet was sent successfully or if an error occurred. After returning back to the original program the original program can continue execution.

The send-packet routine of FIG. 2A suffers several deficiencies. Most notably, the send-packet routine FIG. 2A completely monopolizes the central processing unit such that it cannot perform any other operation while the network hardware is attempting to send a packet. This waste of computing resources needed to be remedied.

An Improved Send-Packet Routine

Figure 2B:
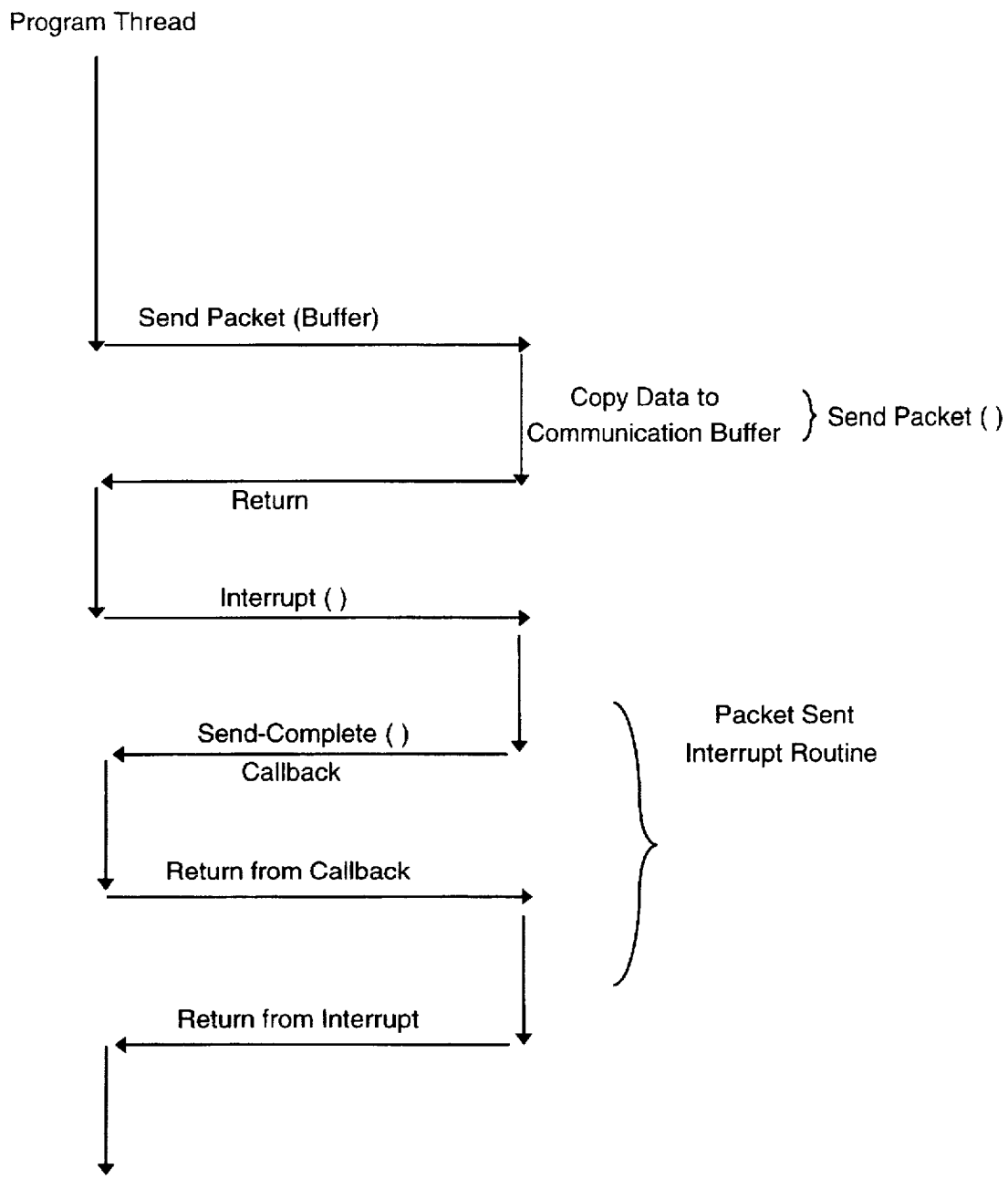
FIG. 2B illustrates the flow of an improved send-packet routine where the send-packet routine copies the data from the communication buffer and then returns back to the original program thread.

FIG. 2B illustrates an improved technique that is used to implement a Novell ODI Send-Packet( ) routine. The improved send-packet routine of FIG. 2B operates as follows. As illustrated in FIG. 2B the normal program thread continues until a data packet needs to be sent. The program then calls the send-packet routine with a buffer that contains the data to be sent. The send-packet routine then copies the data from the received buffer into a private communication buffer. This can be performed with a Direct Memory Access (DMA) operation. After the data to be sent has been copied to a communication buffer the send-packet routine returns back to the original program thread such that the program can continue with its processing operations. The network hardware independently sends the packet out onto the computer network without any further need of CPU resources. Thus, the send-packet routine illustrated in FIG. 2B does not monopolize the CPU resources.

When the network hardware has successfully sent the packet, or if the network hardware has determined that the packet cannot be sent, the results must be reported to the sending program. To report the results, the network hardware interrupts the program thread. This interrupt is caught by a network interrupt handler. If the packet was successfully sent, the network interrupt handler calls a send-complete callback routine with a result code that informs the program thread that the packet has been sent successfully. Otherwise, the network interrupt handler calls a send-complete callback routine with a result code that informs the program that the packet was not sent successfully. After reporting the send-packet results, the network interrupt handler terminates so that the original program threads may continue execution.

Note that it is not necessary for all send-packet calls to generate an interrupt. Some implementations may only interrupt after a number of packets have been sent. The present invention provides the greatest benefit to those implementations that interrupt the processor after each packet has been sent.

Although the improved send-packet routine of FIG. 2B allows the main program thread to continue processing as the network hardware sends the packet, the improved send-packet routine of FIG. 2B still suffers some efficiency drawbacks. Specifically the program thread must wait while the send-packet subroutine copies the packet data from the provided buffer into a private communication buffer. Furthermore, an interrupt routine later interrupts the main program thread when the packet is sent successfully. The interrupt routine calls a callback routine to notify the main program thread that the packet was sent. This routine takes time away from the main program thread. The second interrupt may disturb processor state values such as the contents of a memory cache or a branch target buffer. By disturbing this processor state information, the processor will not execute instructions as efficiently as it normally could.

A Further Improved Send-Packet Routine

Figure 3A:
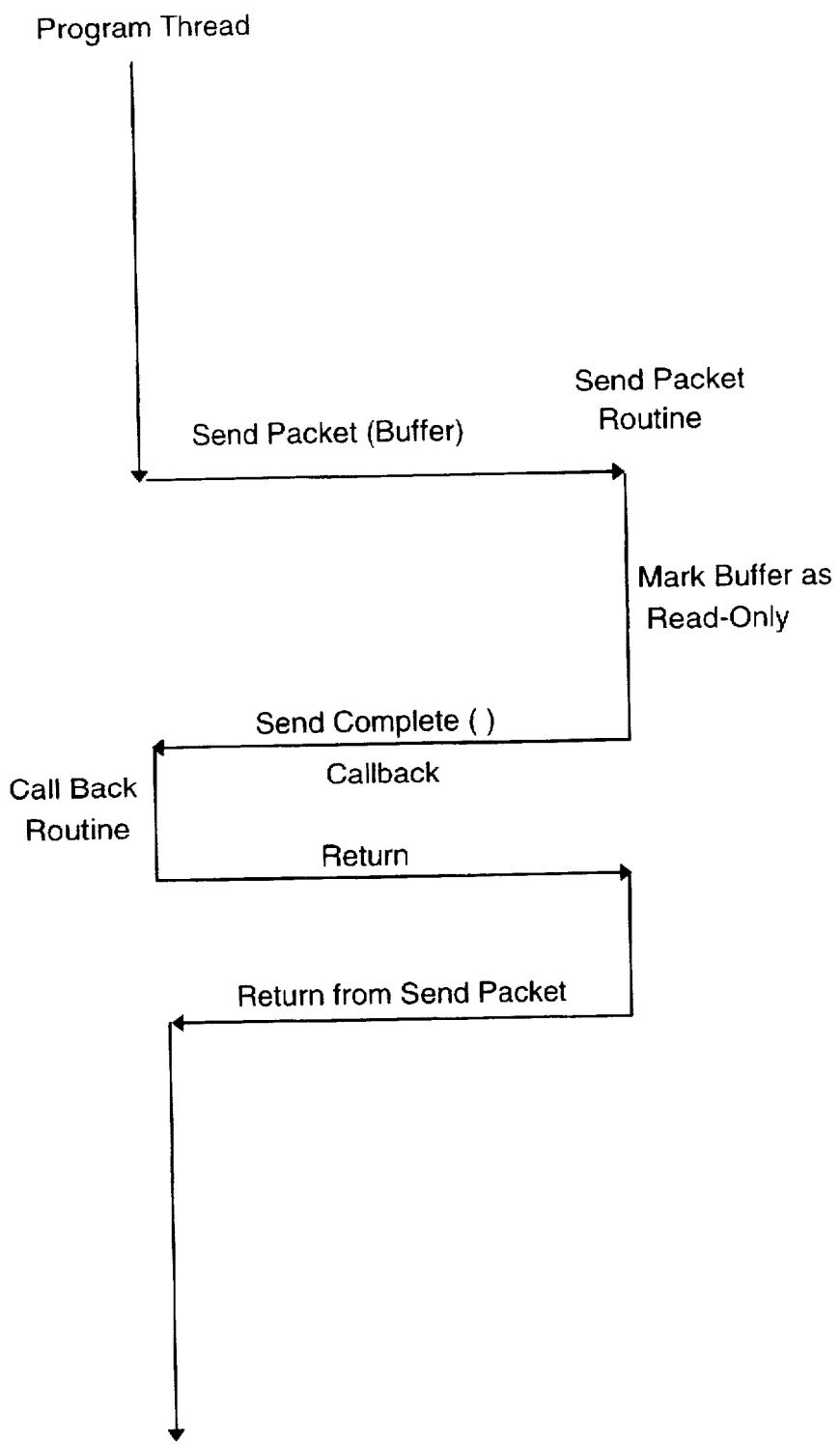
FIG. 3a illustrates the flow of the send-packet routine of the present invention wherein the buffer containing the packet to be sent is marked as read-only and the send-packet routine then indicates that the packet has been sent and then returns back to the original program thread.

FIG. 3a illustrates the program flow of the efficient send-packet routine of the present invention. The efficient send-packet routine of FIG. 3a operates as follows. First the program thread calls the send-packet routine with a buffer containing information to be sent. Upon receiving the buffer, the send-packet routine marks the pages of memory containing the received buffer as read-only using memory protection systems provided by the processor.

After marking the pages of memory containing the received buffer as read-only, the send-packet routine then starts a Direct Memory Access operation to copy the information. Next, the send-packet routine calls the send-complete callback routine to inform the main program thread that the packet has been sent. After calling the send-complete callback routine, the send-packet routine returns back to the original program thread so that the original thread can continue processing. Thus, the send-packet routine of the present invention merely marks the received buffer as read-only, notes its location, and then returns.

The Direct Memory Access operation can copy from the buffer containing the information to be sent while the main program continues its operations. After the buffer that was received during the send-packet routine call is copied with the DMA, it can be changed back to read/write by the some section of network software such that the original program thread can continue to use that buffer. For example, this may occur during subsequent send-packet calls such that each time the send-packet routine is called, the send-packet routine checks to see if there are any buffers from previous calls that should now be changed to read/write. In another embodiment, a network interrupt routine may check if there are any buffers from previous calls that should now be changed to read/write.

To fully describe one embodiment of the present invention, an example with reference to the Intel x86 Architecture processors. To enable write protection on a section of memory, the x86 processor must be in protected mode. (CRO.PE=1) The particular write-protection mode will depend on whether paging is enabled. (Is CRO.PG=1?) Write protection may be enabled on memory segments or memory pages. Write protection on memory segments is possible when CRO.PE=1. To enable segment protection, the W bit set in the Access Rights byte of the memory segment descriptor. Write protection on memory pages is possible when CRO.PE=1 and CRO.PG=1. To enable page protection, the page table entry in the page directory must be modified. Specifically, the R/W bit, the U/S bit, and the WP bit must be set appropriately.

In most situations, the buffer that is marked as read-only by the send-packet routine will not be accessed by the original program thread. This has been tested using diagnostic software. However, in certain rare situations the original program may attempt to write to the buffer that was provided with the send-packet routine call and subsequently marked as read-only. There are two methods of handling this situation.

Figure 3B:
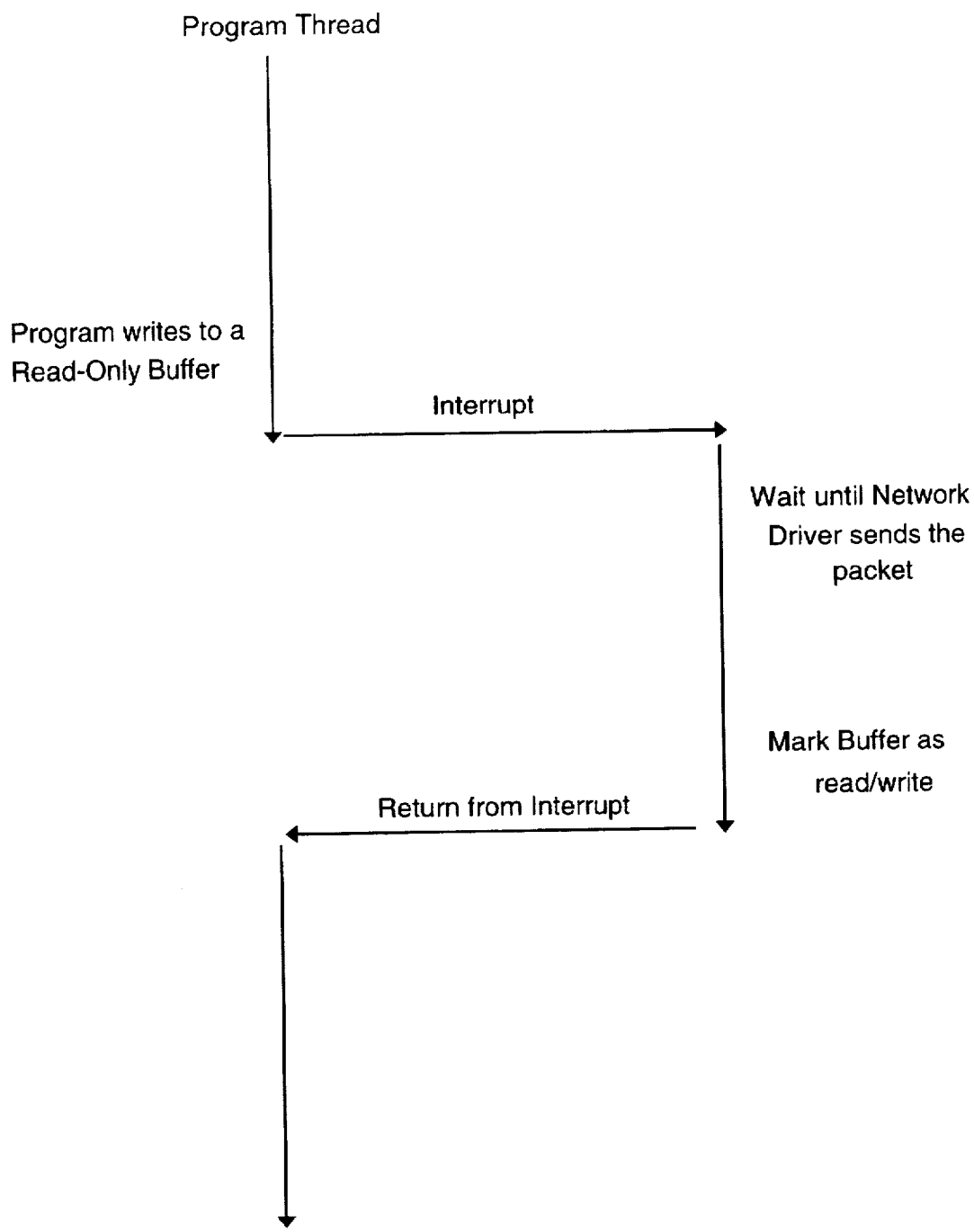
FIG. 3b illustrates the flow of a first embodiment of an interrupt routine that waits until a packet has been sent before marking the memory page as read/write and returning back to the original program thread.

FIG. 3b illustrates a first method for handling a write to read-only buffer. In FIG. 3b, the program thread is continuing along when it attempts to write to read-only buffer. At this point an interrupt occurs. The interrupt handling routine can then stay into a wait loop until the network hardware sends the packet onto the network. After the network hardware completes the send packet operation, the interrupt routine can then change the read-only buffer back to read/write. The interrupt routine can then return back to the original program thread whereby the main program thread can now write to the buffer.

Figure 3C:
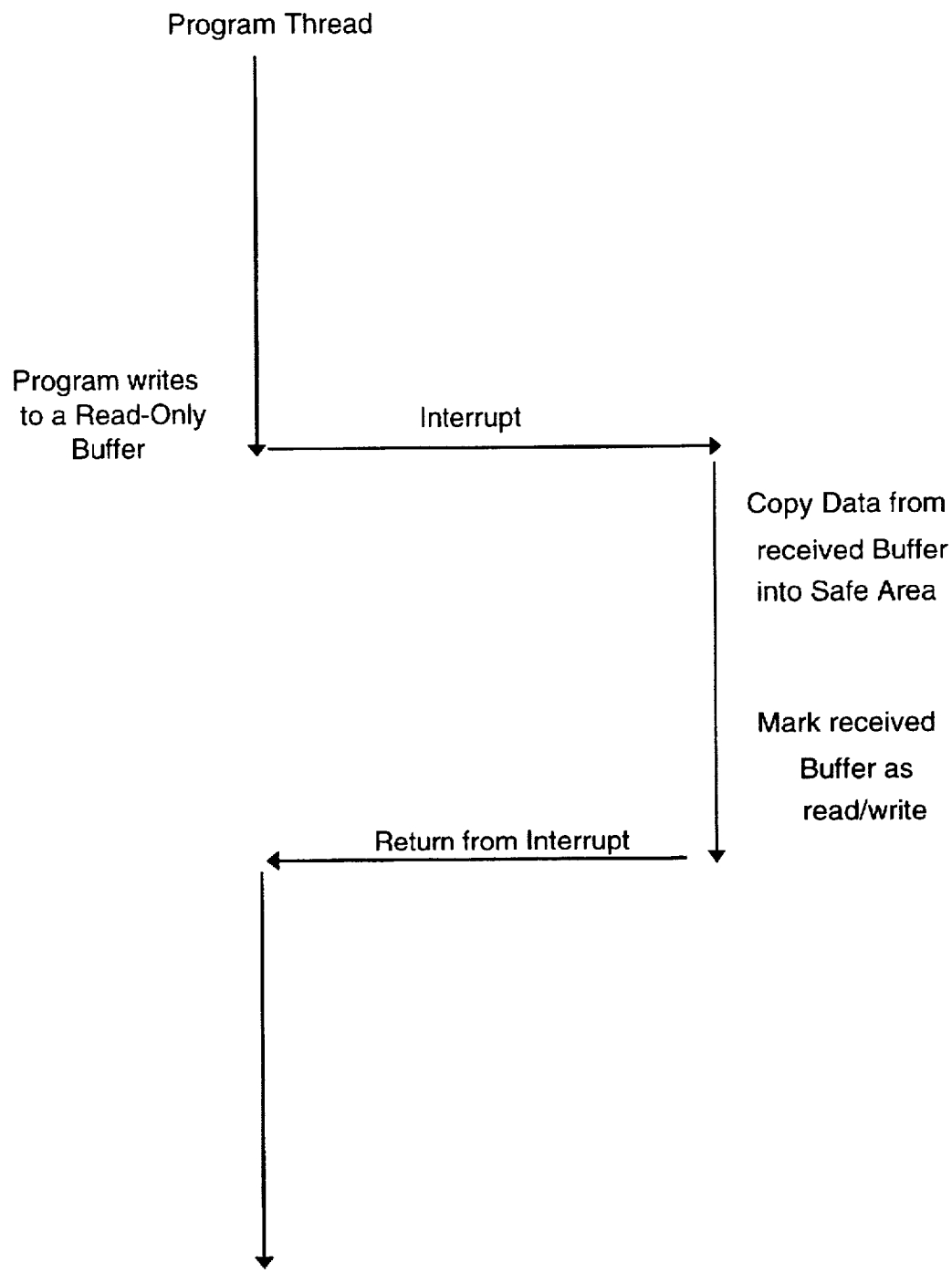
FIG. 3c illustrates the flow of a second embodiment of an interrupt routine that copies the data from a buffer into a safe area and then marks the memory page as read/write and returns back to the original program thread.

FIG. 3c discloses an alternate method of handling writes to read-only pages. In FIG. 3c the program thread is continuing along until it attempts to write to a read-only buffer. When the write attempt to a read-only buffer occurs, the interrupt routine takes over. During the interrupt routine, the information within the buffer supplied during the send-packet call is copied into a private communication buffer. After coping the information, the interrupt routine marks the buffer as read/write and returns back to the original program thread so it may continue. In this situation the performance is no worse than that of the send-packet routine of FIG. 2B since an initial send-packet routine was executed and then additional interrupt is executed. Thus even in the worst case, the present invention is no worse then the send-packet routine of FIG. 2B.

In a preferred embodiment, the teachings of FIG. 3b and FIG. 3c are combined. The hybrid routine operates as follows. When the interrupt routine is activated, the interrupt routine determines the stated of the network hardware. If the network hardware is in the process copying the information from the buffer, either a direct send or copying to network hardware memory, then the interrupt routine will simply wait until the operation is complete. Otherwise, if the buffer is not being actively used by the network hardware, then the interrupt routine will copy the information into a safe place. The network hardware is notified of the new location of the information. After copying the information, the original buffer is changed back to read/write and the interrupt routine ends.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A method for passing information to be sent externally from a computer program to network hardware, said method comprising the steps of:

placing said information to be sent into a buffer;

calling a send-packet routine from said computer program to send said information;

marking said buffer as read-only memory from within said send-packet routine; and returning to the computer program.

2. The method as claimed in claim 1 further comprising the step of:

starting a memory copy operation from within said send-packet routine, said memory copy operation copying the information in the buffer.

3. The method as claimed in claim 1 further comprising the step of:

calling a send-complete callback routine from said send-packet routine to inform said computer program that said packet was sent.

4. The method as claimed in claim 2 further comprising the step of:

marking said buffer as read/write after said memory copy operation has completed.

5. The method as claimed in claim 2 further comprising the step of:

waiting for said memory copy operation to complete if a program attempts to write to said buffer.

6. The method as claimed in claim 1 further comprising the steps of:

determining if a network hardware unit is accessing said buffer;

waiting for said network hardware unit to complete operations if said network hardware unit is accessing said buffer; and copying said information from said buffer into a safe area if said network hardware unit is not accessing said buffer.

7. A computer apparatus for passing a memory block of information to be sent externally from a computer program to network hardware, said apparatus comprising:

a processor, said processor having memory protection features;

a memory unit, said memory unit coupled to said processor, said memory unit comprising a buffer containing said memory block of information;

a network hardware unit, said network hardware unit coupled to said processor; and a send-packet routine in said memory unit, said send-packet routine receiving said memory block of information and setting said memory protection features of said processor such that said buffer is write-protected.

8. The apparatus as claimed in claim 7 wherein said processor comprises an Intel x86 processor.

* * * * *